United States Patent
Ohta et al.

(10) Patent No.: US 7,742,260 B2
(45) Date of Patent: Jun. 22, 2010

(54) MAGNETIC HEAD ASSEMBLY, MAGNETIC HEAD DRIVE APPARATUS AND MANUFACTURING METHOD OF MAGNETIC HEAD ASSEMBLY

(75) Inventors: Naoki Ohta, Tokyo (JP); Nozomu Hachisuka, Tokyo (JP)

(73) Assignee: TDK Corporation, Tokyo (JP)

( * ) Notice: Subject to any disclaimer, the term of this patent is extended or adjusted under 35 U.S.C. 154(b) by 724 days.

(21) Appl. No.: 11/469,091

(22) Filed: Aug. 31, 2006

(65) Prior Publication Data

US 2007/0103815 A1   May 10, 2007

(30) Foreign Application Priority Data

Nov. 10, 2005   (JP)   ............... 2005-326065

(51) Int. Cl.
*G11B 5/55* (2006.01)
(52) U.S. Cl. ..................................... 360/234
(58) Field of Classification Search ............. 360/234.6; 428/64.1; 438/612; 720/718
See application file for complete search history.

(56) References Cited

U.S. PATENT DOCUMENTS

| | | | | |
|---|---|---|---|---|
| 5,936,806 A | * | 8/1999 | Pan et al. .................. | 360/234.6 |
| 6,503,593 B2 | * | 1/2003 | Tronche et al. ............ | 428/64.1 |
| 6,887,777 B2 | * | 5/2005 | Hedler ....................... | 438/612 |
| 6,947,258 B1 | * | 9/2005 | Li ............................. | 360/234.6 |
| 7,194,751 B2 | * | 3/2007 | Fujii et al. .................. | 720/718 |
| 2005/0078414 A1 | * | 4/2005 | Olim ......................... | 360/234.6 |
| 2005/0157425 A1 | * | 7/2005 | Walter et al. ............. | 360/234.6 |
| 2006/0209462 A1 | * | 9/2006 | Kajitani et al. ........... | 360/234.6 |

FOREIGN PATENT DOCUMENTS

| | | |
|---|---|---|
| JP | 04-305877 | 10/1992 |
| JP | 5-36022 | 2/1993 |
| JP | 07-006533 | 1/1995 |
| JP | 10-198938 | 7/1998 |
| JP | 2001216617 A * | 8/2001 |

* cited by examiner

*Primary Examiner*—David D Davis
(74) *Attorney, Agent, or Firm*—Oblon, Spivak, McClelland, Maier & Neustadt, L.L.P.

(57) ABSTRACT

A magnetic head assembly includes a magnetic head slider with an element-formed surface on which at least one MR read head element is formed, an ABS to be opposed in operation to a magnetic recording medium and a fixing surface that is the other side of the ABS, and a support for supporting the magnetic head slider. The fixing surface of the magnetic head slider is fixed to the support by at least cure-shrinkage resin material layer providing a contractive force when cured. The cure-shrinkage resin material layer has at least one strip-shaped pattern running along a track width direction.

6 Claims, 8 Drawing Sheets

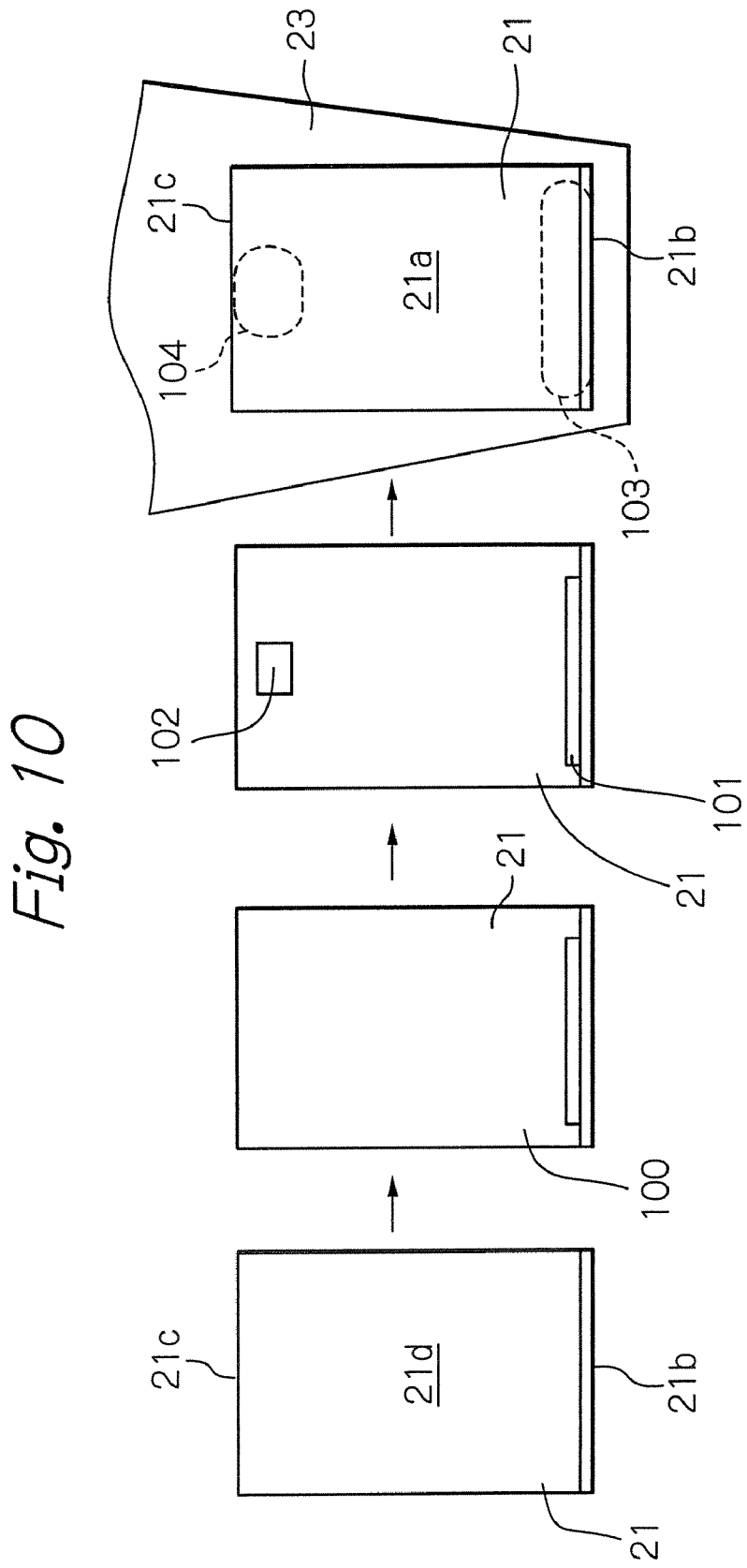

MAGNETIC HEAD ASSEMBLY, MAGNETIC HEAD DRIVE APPARATUS AND MANUFACTURING METHOD OF MAGNETIC HEAD ASSEMBLY

PRIORITY CLAIM

This application claims priority from Japanese patent application No. 2005-326065, filed on Nov. 10, 2005, which is incorporated herein by reference.

BACKGROUND OF THE INVENTION

1. Field of the Invention

The present invention relates to a magnetic head assembly formed by assembling a magnetic head slider with a magnetoresistive effect (MR) read head element and a support such as a suspension, to a magnetic disk drive apparatus with a magnetic head assembly, and to a manufacturing method of a magnetic head assembly.

2. Description of the Related Art

It is known in general that linearity in wave shape of an MR output from an MR read head element will extremely deteriorate when a contractive stress in a track-width direction is applied to the MR read head element.

However, according to the investigation of the inventors of this application, it has been found that although the contractive stress in the track-width direction certainly deteriorates the linearity of the output wave shape, a tensile stress in the track-width direction never deteriorates the output wave shape linearity. Rather, application of such tensile stress in the track-width direction to the MR read head element can improve its output wave shape linearity even if it had already been deteriorated.

Japanese patent publication No. 05-036022A discloses a technique to improve output characteristics of a thin-film magnetic head with a single inductive head element served to perform both read and write operations by applying a stress thereto. The thin-film magnetic head has piezo-electric element layers driven to provide a tensile stress in the track-width direction to its magnetic layer so as to obtain a stable anisotropic performance with a magnetization easy axis along the track-width direction.

According to such known technique, it is possible to form a stable magnetic domain shape with negative magnetostriction in a track region and therefore a normal wave shape read signal with no wiggle noise can be provided. However, this technique is for the inductive read head element but not applicable to the MR read head element. Also, because it is necessary to provide piezo-electric element layers and their drive electrodes in the thin-film magnetic head, not only the structure becomes complicated but also its manufacturing process becomes complicated resulting to increase the manufacturing cost.

SUMMARY OF THE INVENTION

It is therefore an object of the present invention to provide a magnetic head assembly, a magnetic disk drive apparatus and a manufacturing method of the magnetic head assembly, whereby linearity in wave shape of an MR output from an MR read head element can be improved without increasing the structure of the thin-film magnetic head in complexity.

According to the present invention, a magnetic head assembly includes a magnetic head slider with an element-formed surface on which at least one MR read head element is formed, an air bearing surface (ABS) to be opposed in operation to a magnetic recording medium and a fixing surface that is the other side of the ABS, and a support for supporting the magnetic head slider. The fixing surface of the magnetic head slider is fixed to the support by at least cure-shrinkage resin material layer providing a contractive force when cured. The cure-shrinkage resin material layer has at least one strip-shaped pattern running along a track width direction. Here, the magnetic head assembly means an assembly mechanically and electrically assembling a composite thin-film magnetic head or a magnetic head slider having a write head element and a read head element with its support member. More concretely, an assembly of a magnetic head slider and a suspension is in general called as a head gimbal assembly (HGA), an assembly of a magnetic head slider, a suspension and a support arm for supporting the suspension is in general called as a head arm assembly (HAA), and an assembly stacking a plurality of HAAs is in general called as a head stack assembly (HSA).

In case that the magnetic head slider is fixed to the support using at least cure-shrinkage resin material layer which provides a contractive force when cured, the cure-shrinkage resin material layer is formed to have at least one strip-shaped pattern on the fixing surface running along a track width direction. Therefore, when the resin material layer cures, a stress in the crown direction is hardly applied to the magnetic head slider but a stress in the cross-crown direction or the camber direction is only applied to the slider. As a result, only a tensile stress in the cross-crown direction is applied to the MR read head element, linearity in wave shape of an MR output from the MR read head element is extremely improved. Also, because curing and contraction of the resin material layer produce such tensile stress in the cross-crown direction, it is not necessary to change the structure of the magnetic head slider itself. Therefore, the manufacturing process of the magnetic head assembly will not be complicated and also the manufacturing cost will not be increased according to the present invention.

It is preferred that the cure-shrinkage resin material layer includes a single strip-shaped pattern formed on the fixing surface at a position near or in contact with the element-formed surface.

It is also preferred that the cure-shrinkage resin material layer includes a plurality of strip-shaped patterns formed on the fixing surface in parallel with each other at a region including a position near or in contact with the element-formed surface.

It is further preferred that the cure-shrinkage resin material layer includes a single strip-shaped pattern formed on the fixing surface at a position near or in contact with the element-formed surface, and a spot-shaped pattern formed on the fixing surface at a position far from the element-formed surface.

The cure-shrinkage resin material layer may be a layer made of a thermoplastics material or a layer made of a reactive cure resin material.

According to the present invention, also, a magnetic disk drive apparatus includes the aforementioned magnetic head assembly and a magnetic recording medium.

According to the present invention, furthermore, a manufacturing method of a magnetic head assembly, includes a step of preparing a magnetic head slider with an element-formed surface on which at least one MR read head element is formed, an ABS to be opposed in operation to a magnetic recording medium and a fixing surface that is the other side of the ABS, and a support for supporting the magnetic head slider, a step of forming a cure-shrinkage resin material layer providing a contractive force when cured, the cure-shrinkage resin material layer having at least one strip-shaped pattern running along a track width direction, on the fixing surface of the magnetic head slider or on a surface of the support, and a step of curing the cure-shrinkage resin material layer to fix the magnetic head slider to the support.

It is preferred that the forming step includes forming a single strip-shaped pattern of the cure-shrinkage resin material layer on the fixing surface at a position near or in contact with the element-formed surface.

It is also preferred that the forming step includes forming a plurality of strip-shaped patterns of the cure-shrinkage resin material layer on the fixing surface in parallel with each other at a region including a position near or in contact with the element-formed surface.

It is further preferred that the forming step includes forming a single strip-shaped pattern of the cure-shrinkage resin material layer on the fixing surface at a position near or in contact with the element-formed surface, and a spot-shaped pattern of the cure-shrinkage resin material layer on the fixing surface at a position far from the element-formed surface.

The cure-shrinkage resin material layer may be a layer made of a thermoplastics material or a layer made of a reactive cure resin material.

Further objects and advantages of the present invention will be apparent from the following description of the preferred embodiments of the invention as illustrated in the accompanying drawings.

BRIEF DESCRIPTION OF THE DRAWINGS

FIG. 10 is plane views illustrating fixing process of a magnetic head slider and a suspension in another embodiment according to the present invention.

DESCRIPTION OF THE PREFERRED EMBODIMENTS

Figure 1:
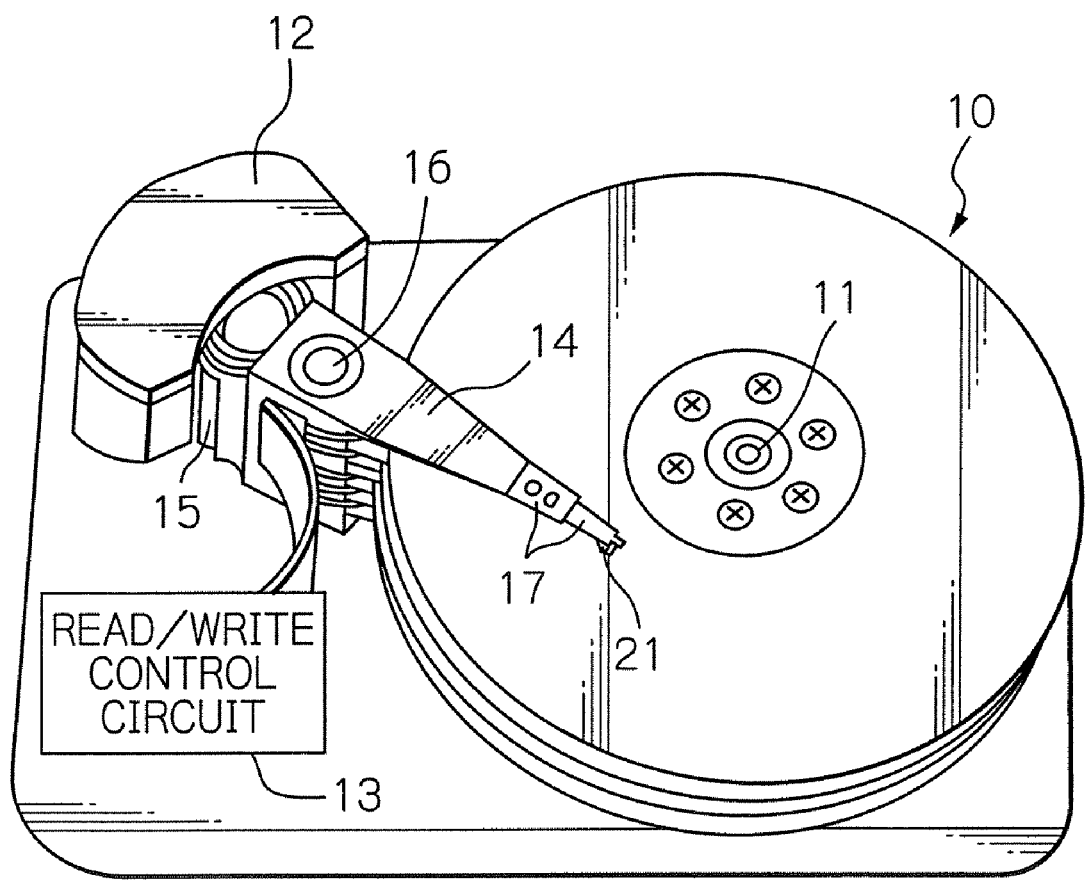
FIG. 1 is an oblique view schematically illustrating main components of a magnetic disk drive apparatus as a preferred embodiment of the present invention.
Figure 2:
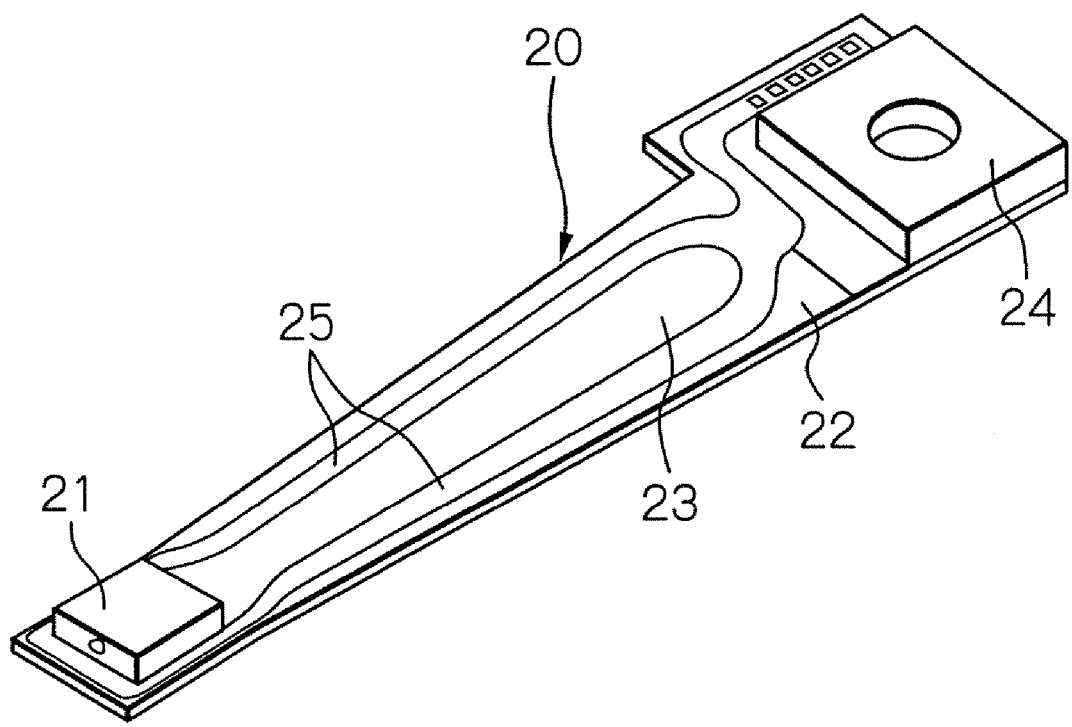
FIG. 2 is an oblique view illustrating a configuration example of an HGA in the embodiment of FIG. 1.

FIG. 1 schematically illustrates main components of a magnetic disk drive apparatus as a preferred embodiment of the present invention, and FIG. 2 illustrates a configuration example of an HGA in the embodiment of FIG. 1.

In FIG. 1, reference numeral 10 denotes a plurality of magnetic hard disks rotating around a rotation axis of a spindle motor 11, 12 denotes an assembly carriage device for positioning each composite thin-film magnetic head or magnetic head slider on a track of each disk, and 13 denotes a read/write control circuit for controlling read and write operations of the thin-film magnetic heads, respectively.

The assembly carriage device 12 has a plurality of drive arms 14 stacked along a pivot-bearing axis 16. These drive arms 14 are capable of rotating around the axis 16 and driven by a voice coil motor (VCM) 15. An HGA 17 is mounted on a top section of each arm 14. Each HGA 17 has the composite thin-film magnetic head or the magnetic head slider 21 mounted at its top end section so that the slider opposes to a surface of each magnetic disk 10. In modifications, a single magnetic disk 10, a single drive arm 14 and a single HGA 17 may be provided.

As shown in FIG. 2, the HGA is assembled by fixing the magnetic head slider 21 having an inductive write head element and an MR read head element to a top end section of a suspension 20, and by electrically connecting one ends of trace conductors to terminal electrodes of the magnetic head slider 21.

The suspension 20 is substantially constituted by a load beam 22 for producing a load to be applied to the magnetic head slider 21, a resilient flexure 23 fixed on and supported by the load beam 22, a base plate 24 attached or formed at a base end section of the load beam 22, and a lead conductor member 25 fixed on the flexure 23 and the load beam 22 and provided with the trace conductors and connection pads electrically connected both ends of the trace conductors.

A structure of the suspension of the HGA that is the magnetic head assembly according to the present invention is not limited to the aforementioned structure.

Figure 3:
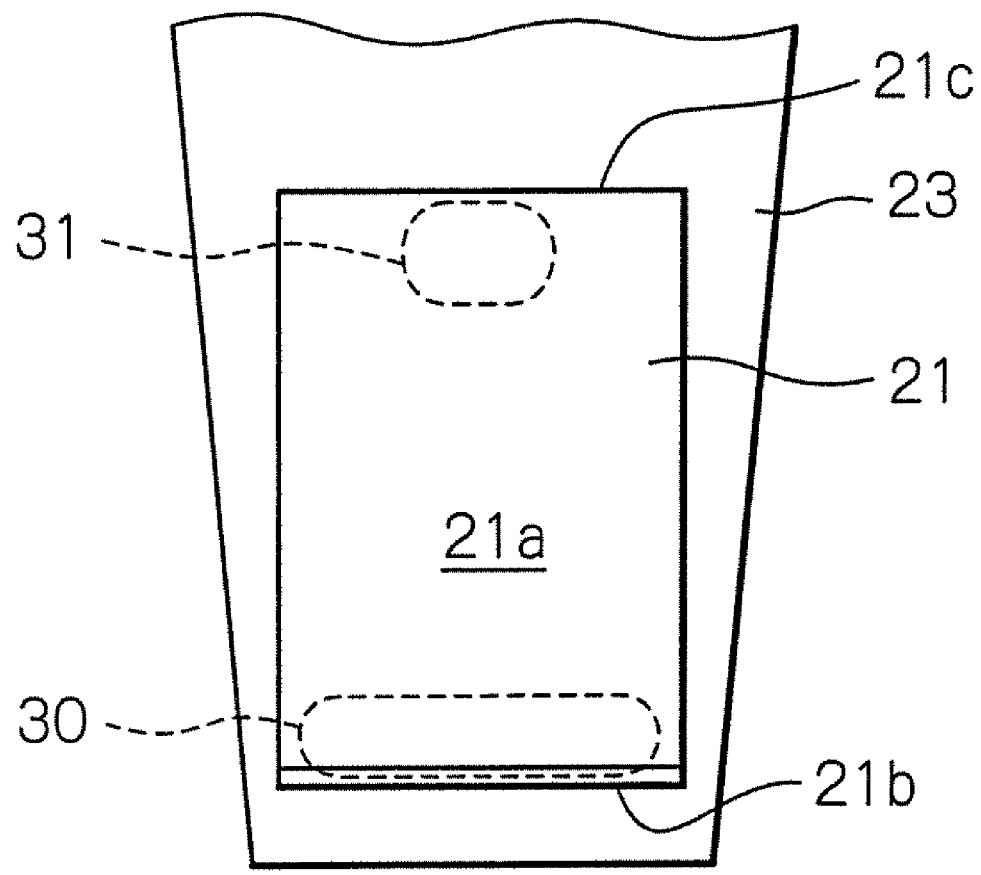
FIG. 3 is a plane view illustrating fixing configuration of a magnetic head slider and a suspension in the embodiment of FIG. 1.

Fixing of the magnetic head slider 21 to the suspension 20 is performed in this embodiment by adhering a fixing surface 21d of the magnetic head slider 21, which is the other side of the ABS 21a, to a surface of the flexure 23 using a reactive cure resin material layer. The reactive cure resin material layer is a cure-shrinkage resin material layer providing a contractive force when cured. As shown in FIG. 3, the reactive cure resin material layer formed on the fixing surface 21d in this embodiment consists of a single strip-shaped pattern 30 running along the track width direction near or in contact with a trailing surface or element-formed surface 21b of the magnetic head slider 21, on which the inductive write head element and the MR read head element are formed, and a spot-shaped pattern 31 formed at the center section of the slider 21 in the track width direction near a leading surface 21c of the slider 21, which is the other side of the element-shaped surface 21b.

Figure 4:
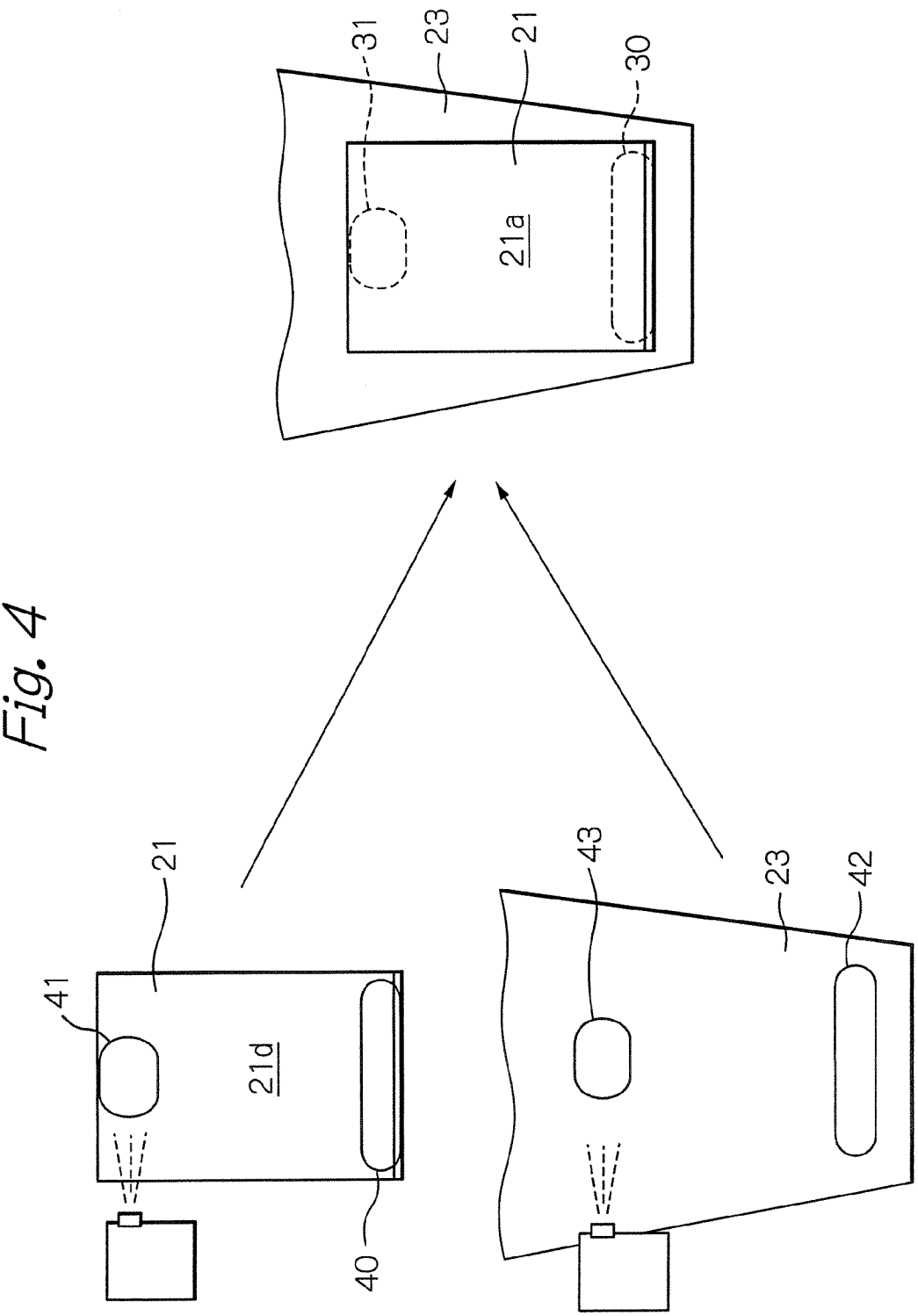
FIG. 4 is plane views illustrating fixing process of the magnetic head slider and the suspension in the embodiment of FIG. 1.

Concretely, the magnetic head slider 21 is adhered to the suspension 20, as follows. As shown in FIG. 4, first, a strip-shaped pattern 40 and a spot-shaped pattern 41 of a first or base component of a two-component type epoxy adhesive such as for example those sold under the trade mark ARALDITE are formed on the fixing surface 21d of the magnetic head slider 21 utilizing an ink jet printing method, a silk screen printing method, an offset printing method or another printing method, or utilizing a coating method, and also a strip-shaped pattern 42 and a spot-shaped pattern 43 of a second or curing component of the two-component type epoxy adhesive are formed at the corresponding positions on the surface of the flexure 23 utilizing an ink jet printing method, a silk screen printing method, an offset printing method or another printing method, or utilizing a coating method. Then, the slider 21 and the flexure 23 are brought together by press to cure and contract the adhesive portions.

As for the reactive cure resin adhesive, an epoxy adhesive, a phenol adhesive, a melanin adhesive, an urea adhesive, an unsaturated polyester adhesive or an alkyd adhesive, which contains the reactive base component, or a single component adhesive such as an alpha-cyanoacrylate that cures through a reaction with environment moisture may be used instead of the two-component type adhesive.

Figure 5:
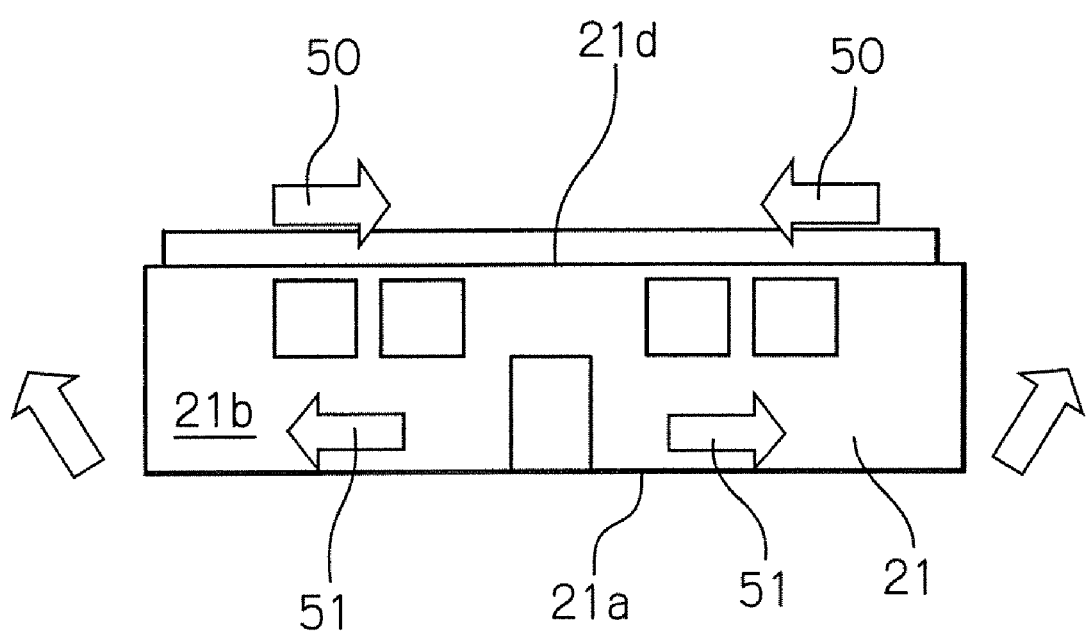
FIG. 5 is a side view illustrating stresses produced when an adhesive is cured and shrunk.

The adhesive has the strip-shaped patterns 40 and 42 running along the track width direction near or in contact with the trailing surface or element-formed surface 21*b*. Therefore, when the adhesive cures, a contractive stress in the track-width direction is applied to a portion of the element-formed surface 21*b* near the fixing surface 21*d* of the magnetic head slider 21 as shown by arrows 50 in FIG. 5, and consequently a tensile stress in the track-width direction is applied to a portion of the element-formed surface 21*b* near the ABS 21*a* of the magnetic head slider 21 as shown by arrows 51 in FIG. 5. This means that a stress is hardly applied in the crown direction of the slider 21 but is applied in the cross-crown direction of the slider 21. As a result, linearity in wave shape of an MR output from the MR read head element is extremely improved. Also, because curing and contraction of the adhesive produce such tensile stress in the cross-crown direction, it is not necessary to change the structure of the magnetic head slider 21 itself. Therefore, the manufacturing process of the magnetic head assembly will not be complicated and also the manufacturing cost will not be increased according to the present invention.

Figure 6:
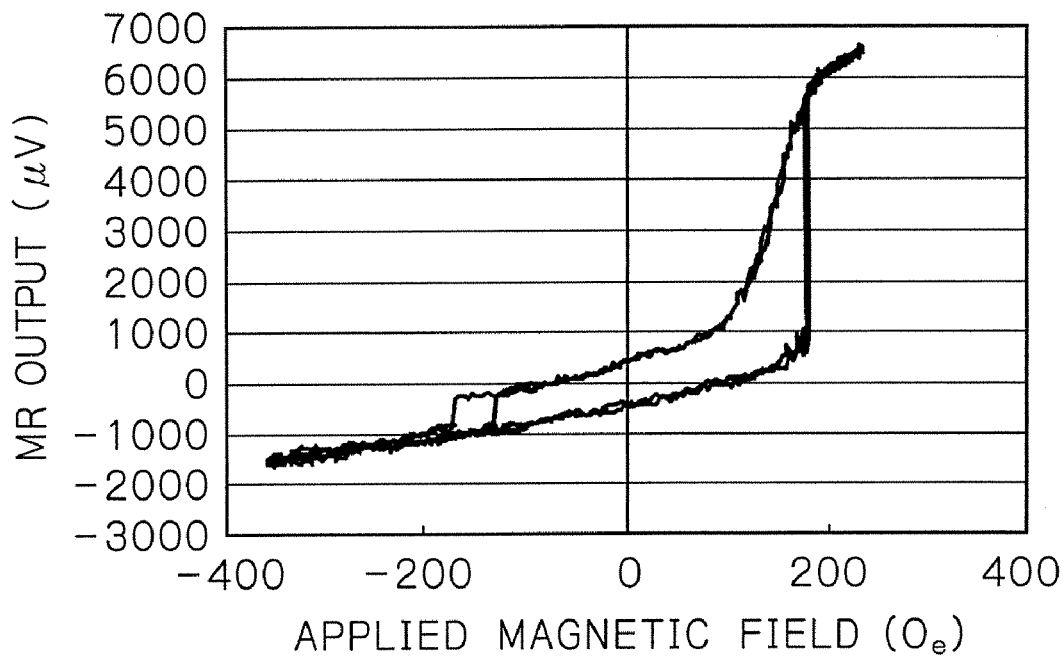
FIG. 6 is a graph illustrating characteristics of MR output with respect to applied magnetic field, measured before reactive cure adhesion.
Figure 7:
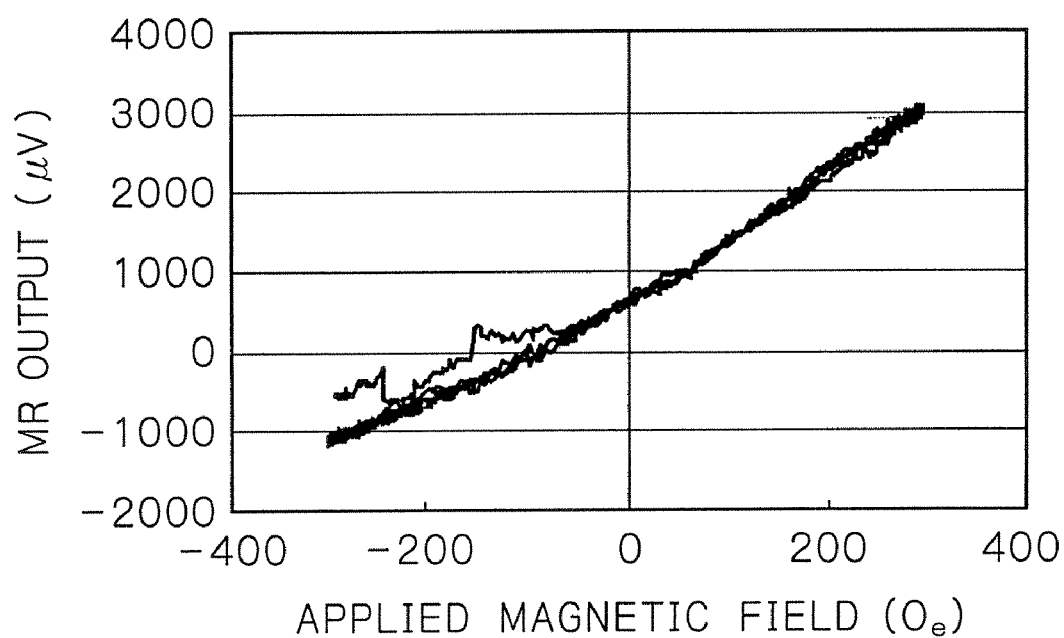
FIG. 7 is a graph illustrating characteristics of MR output with respect to applied magnetic field, measured after the reactive cure adhesion.

FIGS. 6 and 7 illustrate characteristics of MR output with respect to applied magnetic field, measured before and after the reactive cure adhesion, respectively. In the graphs, the lateral axis indicates strength of the applied magnetic field (Oe) and the longitudinal axis indicates the MR output ($\mu$V). These characteristics were actually measured before and after the reactive cure adhesion with respect to a magnetic head slider or pico-slider with dimensions of 1250 $\mu$m×1000 $\mu$m×300 $\mu$m, on which an Araldite layer is formed as a strip-shaped pattern having a width of 200 $\mu$m from the element-formed surface.

Even if the MR read head element of the magnetic head slider has deteriorated characteristics with poor linearity in its output wave shape before the adhesion as shown in FIG. 6, the cross-crown amount increases with about 50 nm from zero whereas the crown amount is kept within specs by performing the reactive cure adhesion with the patterned adhesive of this embodiment, and therefore linearity in wave shape of the MR output is extremely improved as shown in FIG. 7.

Figure 8:
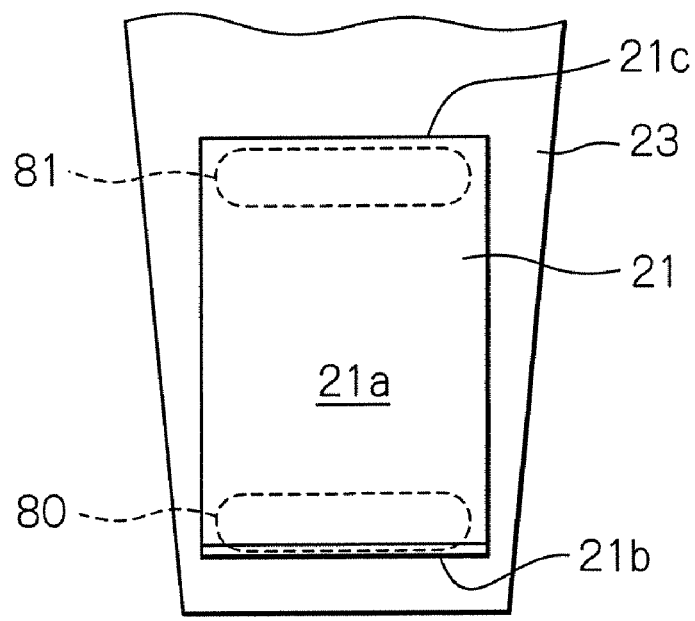
FIG. 8 is a plane view illustrating fixing configuration of a magnetic head slider and a suspension in a modification of the embodiment of FIG. 1.

In a modification of the aforementioned embodiment, as shown in FIG. 8, a reactive cure resin material layer may have a first strip-shaped pattern 80 running along the track width direction near or in contact with the trailing surface or element-formed surface 21*b* of the magnetic head slider 21 and a second strip-shaped pattern 81 running in parallel with the first strip-shaped pattern 80, that is, along the track width direction, near the leading surface 21*c*, which is the other side of the element-shaped surface 21*b*.

Figure 9:
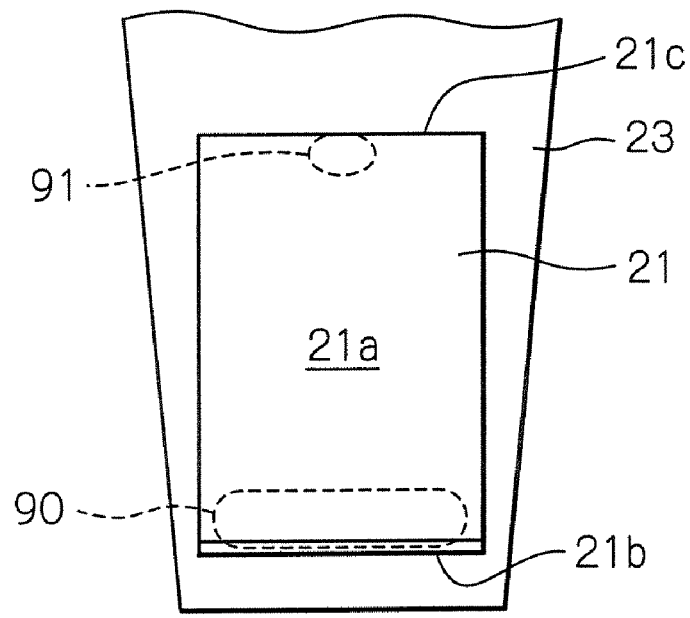
FIG. 9 is a plane view illustrating fixing configuration of a magnetic head slider and a suspension in another modification of the embodiment of FIG. 1.

In another modification of the aforementioned embodiment, as shown in FIG. 9, the magnetic head slider 21 is fixed to the suspension 20 by using a reactive cure resin material layer with a single strip-shaped pattern 90 running along the track width direction near or in contact with the trailing surface or element-formed surface 21*b* of the magnetic head slider 21, and by an adhesive with no curing contraction or a solder with a spot-shaped pattern 91 formed at the center section of the slider 21 in the track width direction near the leading surface 21*c*, which is the other side of the element-shaped surface 21*b*.

In the aforementioned embodiment and the modifications, a base component of the reactive cure resin material is coated on the magnetic head slider and a curing component of the reactive cure resin material is coated on the flexure. However, in further modifications, these components may be coated in reverse. Alternately, the mixture of the base component and curing component may be coated on the magnetic head slider or the flexure.

FIG. 10 illustrates fixing process of a magnetic head slider and a suspension in another embodiment according to the present invention.

In this embodiment, fixing of the magnetic head slider to the suspension is performed by adhesion using a thermoplastics material. The thermoplastics material is a cure-shrinkage resin material providing a contractive force when thermally cured. The configuration and procedure in this embodiment other than the adhesion procedure are the same as these in the embodiment of FIG. 1. The same reference numerals are therefore used in this embodiment for the same elements as these in the embodiment of FIG. 1.

As shown in FIG. 10, first, an acrylic photoresist such as for example a dry-film resist is coated or fixed on the whole fixing surface 21*d* of a magnetic head slider 21. That is, a normal resist material is coated or a sheet resist is stuck to form a photoresist layer 100 on the whole of the fixing surface 21*d*.

Then, the photoresist layer 100 is exposed to light and developed to form patterns 101 and 102.

Then, the magnetic head slider 21 with such photoresist patterns 101 and 102 and the flexure 23 are brought together by press and heat to cure and contract the adhesive portions, and then subjected to cooling. Thus, formed is a thermoplastics adhesive layer with a strip-shaped pattern 103 running along the track width direction near or in contact with the element-formed surface 21*b* of the magnetic head slider 21, and a spot-shaped pattern 104 formed at the center section of the slider 21 in the track width direction near the leading surface 21*c*, which is the other side of the element-shaped surface 21*b*.

Since the adhesive has the strip-shaped pattern 103 running along the track width direction near or in contact with the element-formed surface 21*b*, when the adhesive cures, a tensile stress in the track-width direction is applied to a portion of the element-formed surface 21*b* near the ABS 21*a* of the magnetic head slider 21. This means that a stress is hardly applied in the crown direction of the slider 21 but is applied in the cross-crown direction of the slider 21. As a result, linearity in wave shape of an MR output from the MR read head element is extremely improved. Also, because curing and contraction of the adhesive produce such tensile stress in the cross-crown direction, it is not necessary to change the structure of the magnetic head slider 21 itself. Therefore, the manufacturing process of the magnetic head assembly will not be complicated and also the manufacturing cost will not be increased according to the present invention.

As for the thermoplastics resin material, a polyethylene resin material, a polypropylene resin material, a polycarbonate resin material, a polyvinyl chloride resin material, a polyvinylidene chloride resin material, a polystyrene resin material, a polyvinyl acetate resin material or a fluorine resin material is used, instead of the dry film resist. The thermoplastics resin material is coated to form the strip-shaped pattern 103 and the spot-shaped pattern 104 on the fixing surface 21*d* of the magnetic head slider 21, then, the magnetic head slider 21 with such thermoplastics resin material patterns 103 and 104 and the flexure 23 of the suspension 20 are brought together by press and heat to cure and contract the adhesive portions, and then subjected to cooling. Thus, the thermoplastics adhesive pattern is formed on the magnetic head slider 21. In modifications, such adhesive pattern may be formed on the suspension 20.

It is apparent that the modifications shown in FIGS. 8 and 9 can be also adopted in this embodiment.

Many widely different embodiments of the present invention may be constructed without departing from the spirit and scope of the present invention. It should be understood that the present invention is not limited to the specific embodiments described in the specification, except as defined in the appended claims.

The invention claimed is:

1. A magnetic head assembly, comprising:
a magnetic head slider with an element-formed surface on which at least one magnetoresistive effect read head element is formed and an opposite side surface opposed to said element-formed surface, an air bearing surface to be opposed in operation to a magnetic recording medium and a fixing surface that is the other side of said air bearing surface; and
a support for supporting said magnetic head slider,
said fixing surface of said magnetic head slider being fixed to said support by at least a cure-shrinkage resin material layer providing a contractive force when cured, said cure-shrinkage resin material layer having a single strip-shaped pattern running along a track width direction and formed on said fixing surface at a position tangential to or in contact with said element-formed surface, and a spot-shaped pattern formed on said fixing surface at a position near said opposite side surface.

2. The magnetic head assembly as claimed in claim 1, wherein said cure-shrinkage resin material layer is a layer made of a thermoplastics material.

3. The magnetic head assembly as claimed in claim 1, wherein said cure-shrinkage resin material layer is a layer made of a reactive cure resin material.

4. A magnetic disk drive apparatus including a magnetic head assembly and a magnetic recording medium, said magnetic head assembly comprising:
a magnetic head slider with an element-formed surface on which at least one magnetoresistive effect read head element is formed and an opposite side surface opposed to said element-formed surface, an air bearing surface opposed in operation to said magnetic recording medium, and a fixing surface that is the other side of said air bearing surface; and
a support for supporting said magnetic head slider,
said fixing surface of said magnetic head slider being fixed to said support by at least a cure-shrinkage resin material layer providing a contractive force when cured, said cure-shrinkage resin material layer having a single strip-shaped pattern running along a track width direction and formed on said fixing surface at a position tangential to or in contact with said element-formed surface, and a spot-shaped pattern formed on said fixing surface at a position near said opposite side surface.

5. The magnetic disk drive apparatus as claimed in claim 4, wherein said cure-shrinkage resin material layer is a layer made of a thermoplastics material.

6. The magnetic disk drive apparatus as claimed in claim 4, wherein said cure-shrinkage resin material layer is a layer made of a reactive cure resin material.

* * * * *